United States Patent
Spencer

(10) Patent No.: US 8,228,048 B2
(45) Date of Patent: Jul. 24, 2012

(54) METHOD AND SYSTEM OF REGULATING VOLTAGES

(75) Inventor: John R. Spencer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 12/363,701

(22) Filed: Jan. 30, 2009

(65) Prior Publication Data

US 2010/0194360 A1    Aug. 5, 2010

(51) Int. Cl.
 *G05F 1/00* (2006.01)
(52) U.S. Cl. .................... 323/268; 323/272
(58) Field of Classification Search .............. 323/269, 323/270, 272, 268, 282, 283
See application file for complete search history.

(56) References Cited

U.S. PATENT DOCUMENTS

| 4,881,023 | A | | 11/1989 | Perusse et al. |
| 4,893,228 | A | | 1/1990 | Orrick et al. |
| 5,309,082 | A | | 5/1994 | Payne |
| 6,057,607 | A | * | 5/2000 | Rader et al. ................ 323/274 |
| 6,903,537 | B2 | * | 6/2005 | Tzeng et al. ................ 323/268 |
| 2003/0214274 | A1 | * | 11/2003 | Lethellier ................ 323/272 |
| 2006/0149883 | A1 | * | 7/2006 | Benbow et al. ............ 710/305 |
| 2007/0120543 | A1 | * | 5/2007 | Caldwell ................ 323/272 |
| 2008/0122416 | A1 | * | 5/2008 | Cowell et al. ............ 323/280 |
| 2010/0060078 | A1 | * | 3/2010 | Shaw ...................... 307/31 |

* cited by examiner

*Primary Examiner* — Jue Zhang

(57) ABSTRACT

Regulating voltages. At least some of the illustrative embodiments are systems including a switching circuit configured to produce an intermediate voltage signal from an input voltage signal, and a first voltage regulator coupled the switching circuit and configured to produce a first regulated voltage signal from the intermediate voltage signal. The switching circuit is configured to create the intermediate voltage signal based on a switching signal having a duty cycle, and wherein the duty cycle of the switching signal is open-loop with respect the intermediate voltage signal and the first regulated voltage signal.

13 Claims, 3 Drawing Sheets

METHOD AND SYSTEM OF REGULATING VOLTAGES

BACKGROUND

Computer systems operate by virtue of integrated circuits, such as processors and the various devices that make up a computer system's "chipset" (e.g., one or more bridge devices). As line widths of traces of integrated circuits have decreased to the low nano-meter range, operating voltages have also decreased. For example, chipsets with line widths in the 45 to 65 nano-meter range use supply voltages of 1.5 Volts (V) in some cases, and in other cases 0.75 V.

However, while supply voltages for chipsets have decreased, the voltages supplied by power supply units to motherboards has remained relatively unchanged, with the lowest voltage supplied above that needed for many devices on the motherboard. Thus, motherboards have on-board power supply circuits which regulate the supplied voltages to those needed by the various motherboard components. However, each additional component to perform voltage regulation on the motherboard drives up the incremental cost of the motherboard. Moreover, some voltage regulators produce significant heat that must be dealt with inside the computer system. Thus, advances which reduce heat generation, and which supply the one or more voltages at a reduced cost, provide a competitive advantage.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Open-loop" with respect to a particular identified signal shall mean that while a duty cycle of a switching signal may change, changes in duty cycle (if any) are not responsive to changes in voltage of the particular identified voltage signal.

"Closed-loop" with respect to with respect to a particular identified signal shall mean that duty cycle of a switching signal changes to control the particular identified signal at or near a predetermined voltage.

"Linear-type regulator" shall mean a voltage or current regulator system having a power flow control device (e.g., bipolar junction transistor, field effect transistor) operated in its linear region.

"Switching-type regulator" shall mean a voltage or current regulator system having a power flow control device (e.g., bipolar junction transistor, field effect transistor) operated alternately between an off state and a fully saturated on-state.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
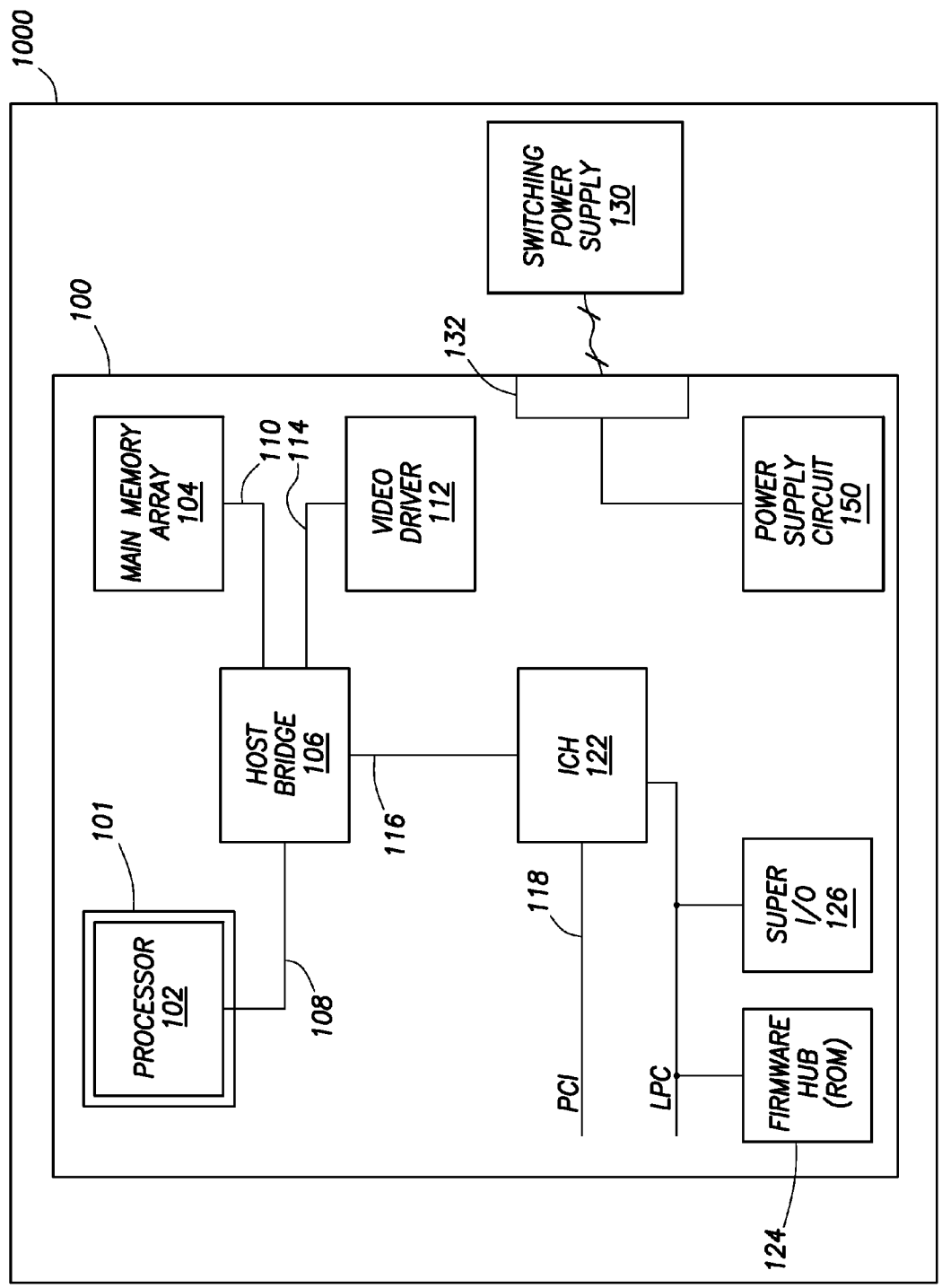
FIG. 1 shows a system in accordance with at least some embodiments.

FIG. 1 illustrates a computer system 1000 constructed in accordance with at least some embodiments. Computer system 1000 comprises a printed circuit board or motherboard 100 upon which various electrical components are coupled. In particular, the motherboard 100 comprises a processor socket 101 within which a processor 102 couples. The processor 102 couples to a main memory array 104, and various other peripheral computer system components, through integrated host bridge 106. The processor 102 couples to the host bridge 106 by way of a host bus 108, or the host bridge 106 may be integrated into the processor 102. Thus, the computer system 1000 may implement other bus configurations or bus-bridges, in addition to, or in place of, those shown in FIG. 1.

Main memory array 104 couples to the host bridge 106 through a memory bus 110. The host bridge 106 comprises a memory control unit that controls transactions to the main memory 104 by asserting control signals for memory accesses. The main memory array 104 functions as the working memory for the processor 102 and comprises a memory device or array of memory devices in which programs, instructions and data are stored. The main memory array 104 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

In some embodiments the computer system 1000 comprises a graphics controller or video driver 112 that couples to the host bridge 106 by way of a peripheral components interconnect (PCI) Express (PCI-E) bus 114, or other suitable type of bus. Alternatively, the video driver 112 may couple to the primary expansion bus 116 or one of the secondary expansion buses (e.g., PCI bus 118). The video driver 112 may further couple to a display device which may comprise any suitable electronic display device upon which any image or text can be represented. In some embodiments, the video driver 112 is integrated with the motherboard 100, and in other embodiments the video driver 112 is an add-in card that is physically and electrically coupled to the motherboard 100.

Still referring to FIG. 1, the computer system 1000 also comprises a second bridge 122 that bridges the primary expansion bus 116 to various secondary expansion buses, such as the PCI bus 118 and low pin count (LPC) bus 120. In accordance with some embodiments, the bridge 122 comprises an Input/Output Controller Hub (ICH) manufactured by Intel Corporation. In the embodiments shown in FIG. 1, the primary expansion bus 116 comprises a Hub-link bus, which is a proprietary bus of the Intel Corporation. However, computer system 1000 is not limited to a chipset manufactured by Intel, and thus other suitable chipsets, and therefore other suitable buses between the bridge devices, may be equivalently used.

A firmware hub 124 couples to the ICH 122 by way of the LPC bus 120. The firmware hub 124 comprises read-only memory (ROM) which contains software programs executable by the processor 102. The software programs comprise not only programs to implement basic input/output system (BIOS) commands, but also instructions executed during and just after power-on self tests (POST) procedures. The POST procedures perform various functions within the computer system before control of the computer system is turned over to the operating system.

A super input/output (I/O) controller 126 couples to the ICH 122 and controls many computer system functions, for example interfacing with various input and output devices such as a keyboard and a pointing device (e.g., mouse), various serial ports and floppy drives. The super I/O controller 126 is often referred to "super" because of the many I/O functions it performs.

Computer system 1000 further comprises a power supply 130, such as a switching power supply, that electrically couples to the motherboard 100 by way of a connector 132 (and corresponding connector on the cable which is not shown so as not to unduly complicate the figure). The power supply 130 produces a variety of power signals with different direct current (DC) voltages, such as +12 Volt (V), −12 V, +5 V, −5V and +3.3V. The various power signals provided from the power supply 130 are divided into groups: main; and auxiliary. The power signals in the "main" category (e.g., +−12V, +−5V and +3.3V) may be selectively turned on and off within the power supply. The one or more power signals in the "auxiliary" category (e.g., +5V) remain powered when the power signals in the main category are powered-off. For example, in some powered-off modes (i.e., sleep state), all the power signals in the main category are powered-off, yet the computer system powers a small subset of devices from the auxiliary category to monitor for wake indications from the user (e.g., keyboard activity, mouse activity or local area network (LAN) activity).

Although the power supply 130 provides a host of power signals with different voltages, other voltages may be needed on the motherboard 100. For example, some of the integrated circuits on the motherboard 100 may operate based on a 1.5V supply, but the power supply 130 does not provide such a power signal. As yet another example, various devices on the motherboard that are operational in the sleep state may use a 3.3V supply, but in some cases the power supply 130 provides only a 5V power signal in the auxiliary category when the main power signals are powered-off. In order to remedy the situation, the motherboard 100 in accordance with the various embodiments comprises a power supply circuit 150 that couples to one or more power signals provided from the power supply 130 through connector 132. The power supply circuit 150 comprises a plurality of voltage regulators that create power signals whose voltages are different than those provided from the power supply 130.

Figure 2:
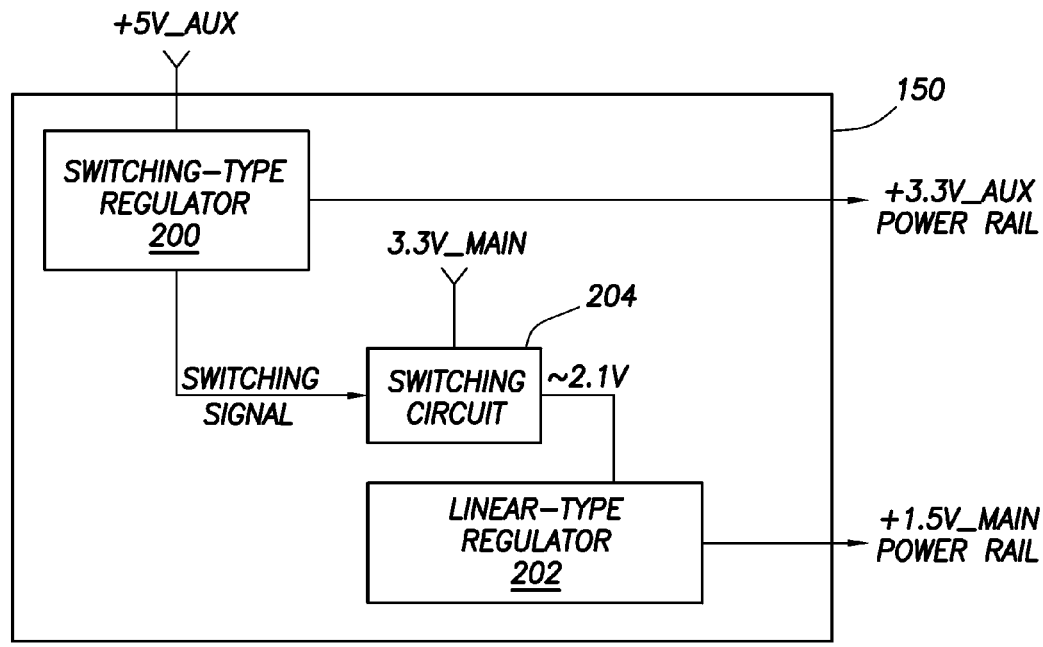
FIG. 2 shows a block diagram of a power supply circuit in accordance with at least some embodiments.

FIG. 2 shows at least a portion of the power supply circuit 150 in block diagram form. In particular, the power supply circuit 150 in accordance with at least some embodiments comprises a switching-type regulator 200, a linear-type regulator 202, and a switching circuit 204. The switching-type regulator 200 couples to the +5V power signal from the auxiliary category (+5V_AUX). The switching-type regulator 200 is configured to create a +3.3V power signal from the +5V_AUX (i.e., creates a +3.3V_AUX). As the name implies, the illustrative switching-type regulator 200 uses a power flow control device (e.g., bipolar junction transistor, field effect transistor) operated alternately between an off-state (non-conductive) and a fully saturated on-state. As part of the creation of the +3.3V_AUX power signal, the switching-type regulator produces a variable duty cycle switching signal, where changes in the duty cycle of the switching signal are based on closed-loop control of the +3.3V_AUX power signal.

Still referring to FIG. 2, the linear-type regulator 202 couples to the +3.3V power signal from the main category (+3.3V_MAIN). The linear-type regulator 202 is configured to create a +1.5V power signal from the +3.3V_MAIN (i.e., creates a +1.5V_MAIN). As the name implies, the illustrative linear-type regulator 202 uses a power flow control device (e.g., bipolar junction transistor, field effect transistor) operated in its linear region. Thus, the illustrative +1.5V_MAIN power signal is created based on a voltage drop across the power flow control device. Power usage, and thus heat generation, varies with the square of the voltage drop across a device. If the power flow control device of the linear-type regulator 202 dropped the +3.3V_MAIN to be the +1.5V_MAIN directly, significant heat would be generated by the linear-type regulator 202.

In order to reduce the voltage drop across the power regulator of the linear-type regulator 202, and in accordance with the various embodiments, the power supply circuit 150 comprises a switching circuit 204. The switching circuit 204 is configured, in the embodiments illustrated, to reduce the voltage applied to the power regulator of the linear-type regulator 202. In cases where the +1.5V_MAIN is created from the +3.3V_MAIN, the switching circuit 204 is configured to created an intermediate voltage on the order of +2.1V from the +3.3V_MAIN signal. The linear-type regulator 202, in turn, reduces the intermediate voltage to create the +1.5V_MAIN power signal. However, less heat is generated by the switching circuit 204 in reducing the voltage from +3.3V to +2.1V, and then the linear-type regulator creating the +1.5V_MAIN, than if the entire +3.3V to +1.5V reduction takes place in the linear-type regulator.

While it may be possible to have a stand-alone switching-type regulator performing closed-loop control to reduce the voltage supplied from the +3.3V_MAIN power signal to the linear-type regulator 202, the inventor of the present specification has found that a complete switching-type regulator with closed-loop control is not needed; rather, the switching circuit 204 may operate based on a switching signal from another location, such as the switching signal created and utilized in the switching-type regulator 200. By using a switching signal from another circuit, fewer components are needed on the motherboard, thus reducing the incremental cost of the motherboard. The duty cycle of the switching signal used by the switching circuit 204 may be open-loop with respect to the power signal at the output of the switching circuit 204; however, so long the voltage created by the switching circuit 204 is above a predetermined minimum at a worst case duty cycle of the switching signal, the combined switching circuit 204 and linear-type regulator 202 produce the desired power signals at a lower cost and with less heat generation.

Figure 3:
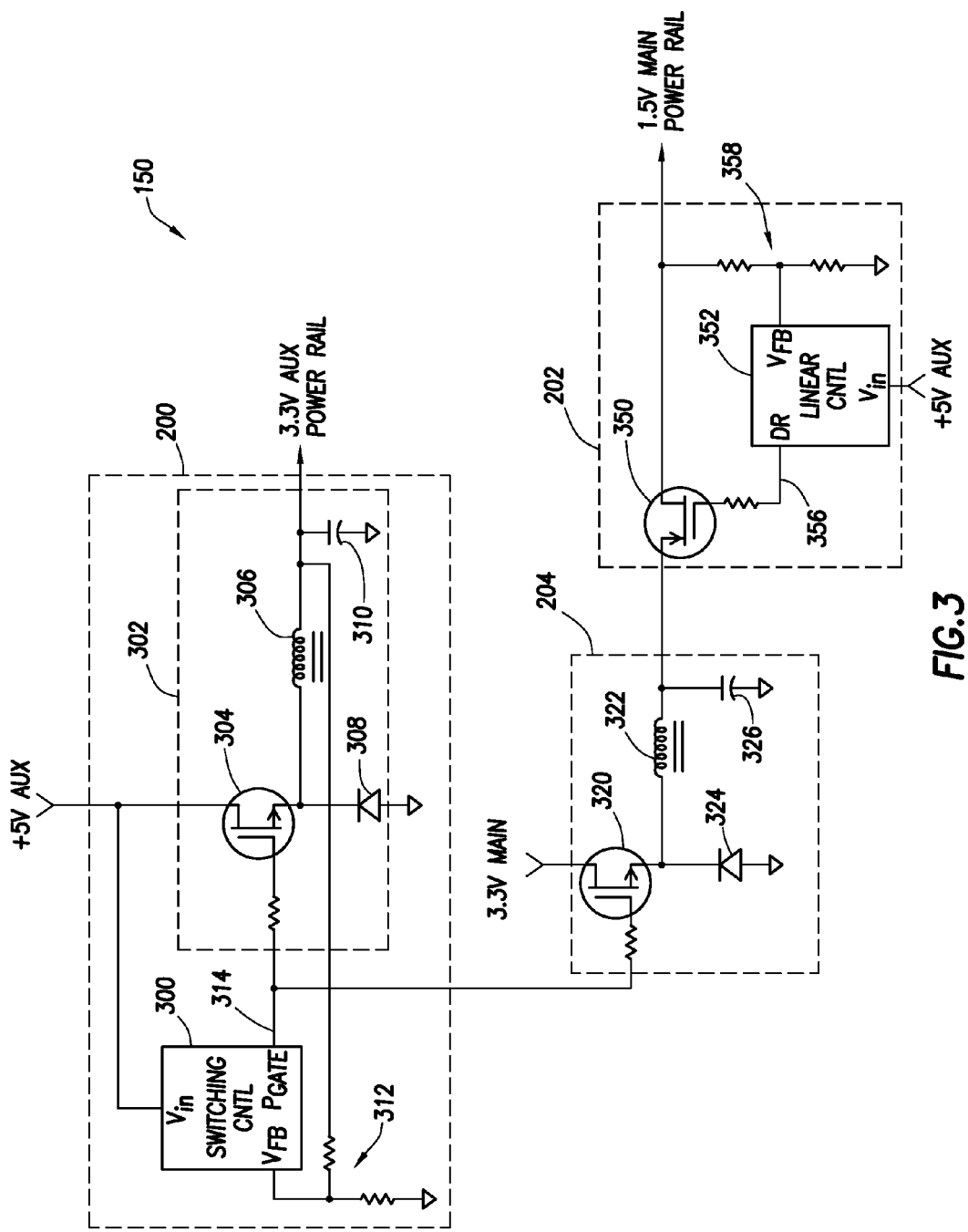
FIG. 3 shows an electrical schematic of a power supply circuit in accordance with at least some embodiments.

FIG. 3 illustrates an electrical diagram of the power supply circuit 150 of FIG. 2. In particular, the switching-type regulator 200 comprises a switching circuit 302. The switching circuit 302 comprises a power control device 304 (such as part no. FDC638P P-Channel MOSFET available from Fairchild Semiconductor of San Jose, Calif.) coupled to an inductor 306, a diode 308 and a capacitor 310, all arranged to produce a voltage change (in this example, a voltage reduction or a "buck-type" arrangement). The switching-type regulator 200 also comprises a switching control circuit 300 (such as a part no. LTC3772 DC/DC controller available from Linear Technology of Milpitas, Calif.). The switching control circuit 300 produces a variable duty cycle switching signal 314 (at the illustrative Pgate output) that couples to the gate of the FET 304. The duty cycle is determined by the switching control circuit 300 based a feedback voltage applied to the illustrative Vfb input through a voltage divider circuit 312. The switching signal alternately turns the FET 304 on and off, with the on time and off time set by the duty cycle of the switching signal. Thus, the switching control circuit 300 and related circuitry provide closed loop control of the output power signal, +3.3V_AUX in this example, by varying the duty cycle of the switching signal.

FIG. 3 also shows illustrative electrical diagrams of the switching circuit 204 and linear-type regulator 202. The switching circuit 204 comprises a power control device 320 (such as part no. FDC638P from Fairchild Semiconductor) coupled to an inductor 322, a diode 324 and a capacitor 326, all arranged to produce a voltage change (in this example, a voltage reduction or a "buck-type" arrangement). However, in accordance with the various embodiments, no dedicated switching control circuit is needed or used for the switching circuit 204. Rather, the switching signal coupled to the gate for the FET 320 of the switching circuit 204 is selected from any constant duty cycle switching signal, or any variable duty cycle switching signal, available on the motherboard where the frequency and the duty cycle (or expected range of duty cycles) of the selecting switching signal produces the desired result. In the illustrative case of the switching circuit 204 reducing the +3.3V_MAIN power signal to an intermediate voltage of approximately +2.1 Volts, a duty cycle of about 66% may be used (3.3V*0.66=~2.1V). While any switching signal with a duty cycle at or near 66% may be used, the switching signal 314 of the illustrative switching-type regulator 200 has an appropriate duty cycle (5.0V*0.66=3.3V). Thus, in the illustrative embodiments the switching signal 314, in addition to coupling to the switching circuit 302 and providing closed-loop control, also couples to the FET 320 and thus provides open-loop control for creation of the intermediate voltage supplied to the linear-type regulator 204.

Still referring to FIG. 3, the linear-type regulator 204 comprises a power control device 350 (such as part no. NTD4815NHT4G N-Channel MOSFET available from Semiconductor Components Industries, LLC, of Phoenix, Ariz.). The linear-type regulator 204 also comprises a linear control circuit 352 (such as a part no. RT9174PS controller available from Richtek Technology Corporation, of Santa Clara, Calif.). The linear control circuit 352 produces a variable voltage DC signal 356 (at the illustrative DR output) that couples to the gate of the FET 350. The voltage applied to the gate of the FET 350 is determined by the linear control circuit 352 based a feedback voltage applied to the illustrative Vfb input through a voltage divider circuit 358. The variable voltage DC signal controls the FET 350 within its linear region, and thus controls the voltage drop across the FET 350 such that the output voltage is at the predetermined set point (in this example, the +1.5V_MAIN). However, because of the voltage reduction of the switching circuit 204 (in this illustrative case from 3.3V to about 2.1 volts), the power to be dissipated by the FET 350 is reduced.

Figure 4:
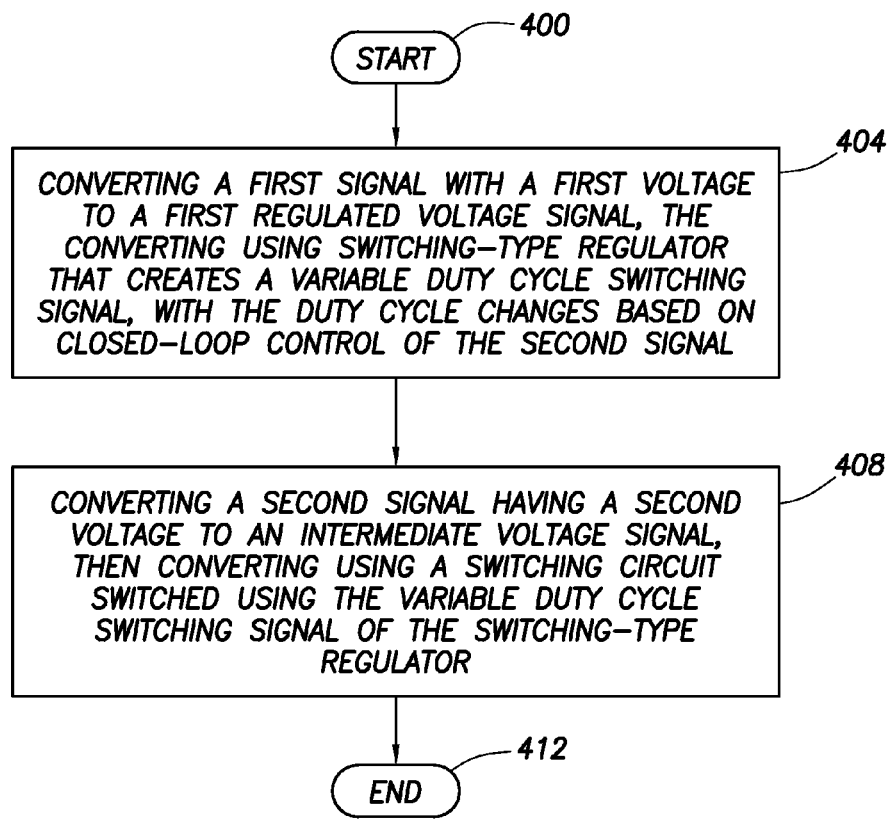
FIG. 4 shows a method in accordance with at least some embodiments.

FIG. 4 illustrates a method in accordance with at least some embodiments. In particular, the method starts (block 400) and proceeds to converting a first signal with a first voltage to a first regulated voltage signal, the converting using switching-type regulator that creates a variable duty cycle switching signal, with the duty cycle changes based on closed-loop control of the second signal (block 404). Next, the illustrative method involves converting a second signal having a second voltage to an intermediate voltage signal, the converting using a switching circuit switched using the variably duty cycle switching signal of the switching-type regulator (block 408), and the method ends (block 412).

The above discussion is meant to be illustrative of the principles and various embodiments of the present invention. Numerous variations and modifications will become apparent to those skilled in the art once the above disclosure is fully appreciated. For example, depending on the voltages of power signals used on the motherboard, the switching circuit 204 may act to increase the applied voltages (i.e., act as a boost-type or a boost/buck-type circuit) using the switching signal from another voltage regulator. It is intended that the following claims be interpreted to embrace all such variations and modifications.

What is claimed is:

1. A system comprising:
 a switching circuit configured to produce an intermediate voltage signal from a first input voltage signal; and
 a first voltage regulator coupled the switching circuit and configured to produce a first regulated voltage signal from the intermediate voltage signal;
 wherein the switching circuit is configured to create the intermediate voltage signal based on a switching signal having a duty cycle, and wherein the duty cycle of the switching signal is open-loop with respect to the intermediate voltage signal and the first regulated voltage signal; and
 wherein the switching circuit couples to the switching signal that originates from a second voltage regulator configured to produce a second regulated voltage signal based on a second input voltage signal, the second input voltage signal different than the first input voltage signal, the second regulated voltage signal different than the first regulated voltage signal and different than the intermediate voltage signal, and the duty cycle of the switching signal configured to change responsive to closed-loop control of the second regulated voltage.

2. The system of claim 1 wherein the first voltage regulator comprises a linear-type regulator.

3. The system of claim 1 wherein the switching signal is configured to have a variable duty cycle.

4. The system of claim 1 wherein the switching circuit is configured to reduce the voltage of the input voltage signal to be the intermediate voltage signal.

5. The system of claim 1 wherein the input voltage signal is 3.3 volts, and the first regulated voltage signal is 1.5 volts.

6. A motherboard comprising:
 a printed circuit board;
 a socket for a main processor, the socket coupled to the printed circuit board; and
 a power supply circuit coupled to the printed circuit board, the power supply circuit comprising:
  a switching circuit configured to produce an intermediate voltage signal from a first input voltage signal;
  a linear-type regulator coupled the intermediate voltage signal, the linear-type regulator configured to produce a first regulated voltage signal from the intermediate voltage signal; and
  a switching-type regulator configured to create a second regulated voltage signal based on a second input voltage signal, the second input voltage signal different than the first input voltage signal, the second regulated voltage signal different than both the first regulated voltage signal and the intermediate voltage signal, the switching-type regulator comprising:
- a control circuit configured to create a switching signal with variable duty cycle, changes in duty cycle of the switching signal are closed-loop with respect to the second regulated voltage; and
- an electrically controlled switch coupled to the switching signal, the electrically controlled switch configured to selectively operate based on the switching signal;

wherein the switching circuit couples to the switching signal with a variable duty cycle, the changes in duty cycle of the switching signal are open-loop with respect to the intermediate voltage signal and the first regulated voltage signal, and the switching circuit is configured to create the intermediate voltage signal based on the switching signal.

7. The motherboard of claim 6 further comprising:
a connector coupled to the printed circuit board and configured to couple to a power supply unit;
wherein the switching-type regulator is configured to create the second regulated voltage from a 5 Volt signal supplied through the connector.

8. The motherboard as in claim 6 wherein the switching circuit is configured to reduce voltage to create the intermediate voltage signal.

9. The motherboard as in claim 6 wherein the first regulated voltage signal is 1.5 Volts, and the second regulated voltage signal is 3.3 Volts.

10. The motherboard as in claim 9 further comprising:
a connector coupled to the printed circuit board and configured to couple to a power supply unit;
wherein the switching circuit is configured to create the intermediate voltage signal from a 3.3 Volt signal supplied through the connector.

11. A method comprising:
converting a first input voltage signal with a first voltage to a first regulated voltage signal, the converting using switching-type regulator that creates a variable duty cycle switching signal, with the duty cycle changes based on closed-loop control of the first regulated voltage signal; and
converting a second input voltage signal having a second voltage to an intermediate voltage signal, the second voltage different than the first voltage, the converting using a switching circuit switched using the variable duty cycle switching signal of the switching-type regulator.

12. The method of claim 11 further comprising converting the intermediate voltage signal to a second regulated voltage signal, the converting using a linear-type regulator.

13. The method of claim 12 further comprising:
wherein converting the second signal further comprises converting a 3.3 Volt signal to the intermediate voltage signal; and
wherein converting the intermediate voltage signal to the second regulated voltage further comprises converting to a 1.5 Volt signal.

* * * * *